United States Patent Office 3,558,477
Patented Jan. 26, 1971

3,558,477
REFORMING WITH A PLATINUM-RHENIUM CATALYST
Harris E. Kluksdahl, San Rafael, Calif., assignor to Chevron Research Company, San Francisco, Calif., a corporation of Delaware
Continuation-in-part of application Ser. No. 639,719, May 19, 1967, which is a continuation-in-part of application Ser. No. 560,166, June 21, 1966, now abandoned. This application May 14, 1968, Ser. No. 729,079
The portion of the term of the patent subsequent to Dec. 10, 1985, has been disclaimed
Int. Cl. C10g 35/08
U.S. Cl. 208—138
4 Claims

ABSTRACT OF THE DISCLOSURE

A reforming process utilizing as a catalyst a composition of matter comprising a porous solid carrier in association with 0.1 to 3.0 weight percent platinum, and 0.1 to 3.0 weight percent rhenium with a rhenium to platinum atomic ratio of less than 1.0. The platinum and rhenium are disposed on the surface of the carrier by impregnation with water soluble compounds of the metals, followed by simultaneous reduction of the compounds.

CROSS-REFERENCE

This application is a continuation-in-part of application Ser. No. 639,719, filed May 19, 1967, now U.S. Patent 3,415,737, issued Dec. 10, 1968, which is in turn a continuation-in-part of application Ser. No. 560,166, filed June 21, 1966, now abandoned.

BACKGROUND OF THE INVENTION

Field

The present invention relates to a catalytic composition of matter useful for hydrocarbon reforming processes. The catalytic composition comprises platinum and rhenium supported on a porous solid carrier.

Prior art

Catalytic compositions comprising platinum, for example, platinum supported on alumina, are used extensively in the petroleum industry for reforming of naphthas and gasoline boiling range materials in order to produce high octane number gasolines. Catalysts comprising platinum are highly selective towards the production of high octane aromatics and highly active for the several reactions that occur during reforming. The platinum is generally considered to exist as small particles of the metal dispersed on the support, e.g. alumina.

In application Ser. No. 560,166, filed June 24, 1966 (now abandoned) and application Ser. No. 639,719, filed May 19, 1967, now U.S. Pat. 3,415,737, issued Dec. 10, 1968, a novel reforming process is disclosed and claimed. The process comprises the reforming of naphtha fractions to produce high octane gasoline using a catalyst containing platinum and rhenium in association with a porous solid carrier, preferably alumina. The catalyst composition is disclosed as comprising from 0.01 to 3.0 weight percent platinum and 0.01 to 5.0 weight percent rhenium. The platinum-rhenium catalyst is shown therein to possess exceptionally high yield stability in the reforming of naphtha fractions; the platinum-rhenium catalyst exhibits significantly better yield stability than a catalyst comprising platinum without rhenium. The yield of $C_5+$ gasoline products remains high during normal reforming operations using the platinum-rhenium catalyst; even at severe conditions of reforming, such as high feed rates, low pressures, etc., the yield of $C_5+$ product does not decrease as rapidly throughout the run as when reforming with a platinum catalyst without rhenium at the same severity conditions. The platinum-rhenium catalyst, besides exhibiting excellent yield stability, also shows good selectivity and activity in the production of high octane gasoline products.

SUMMARY OF THE INVENTION

A composition of matter has been discovered having certain specified ranges of platinum and rhenium. The composition of matter comprises a porous solid support or carrier in association with from 0.1 to 3.0 weight percent platinum and 0.1 to 3.0 weight percent rhenium. The atomic ratio of rhenium to platinum is less than about 1.0, the platinum and rhenium appearing to exist as an alloy, and more particularly to exist as essentially a solid solution of rhenium dispersed throughout the face-centered cubic structure of platinum. The platinum-rhenium catalyst as defined above is prepared by disposing the metals onto the surface of the carrier by impregnating the support successively or simultaneously with water soluble compounds of the metals and simultaneously reducing both compounds to metal.

BRIEF DESCRIPTION OF THE DRAWINGS

The present invention may be better understood and will be further explained hereinafter with reference to the graphs in FIGS. 1 and 2. The graph in FIG. 1 shows the fouling rate, that is, the degrees Fahrenheit (°F) increase in reforming temperature per unit of time necessary to maintain a constant octane product, as a function of the amount of rhenium on a catalyst comprising 0.6 weight percent platinum on alumina. The data was obtained from a reforming process conducted at conditions, including a pressure of 125 p.s.i.g., and a liquid hourly space velocity of 3.0, to produce a gasoline product having a 102 F–1 clear octane rating. The graph in FIG. 2 shows the volume of methane produced per barrel of feed as a function of the weight percent rhenium on a catalyst comprising 0.6 weight percent platinum on alumina. The data used for FIG. 2 was obtained in the same reforming process described above for FIG. 1. It is clear from FIG. 1 that very low levels of rhenium result in higher fouling rates than catalyst composiitons having higher levels of rhenium. From FIG. 2, it is seen that when the level of rhenium exceeds that of platinum, that is when the rhenium to platinum atomic ratio exceeds about 1.0, that the methane production increases significantly.

DESCRIPTION OF THE INVENTION

Figure 1:
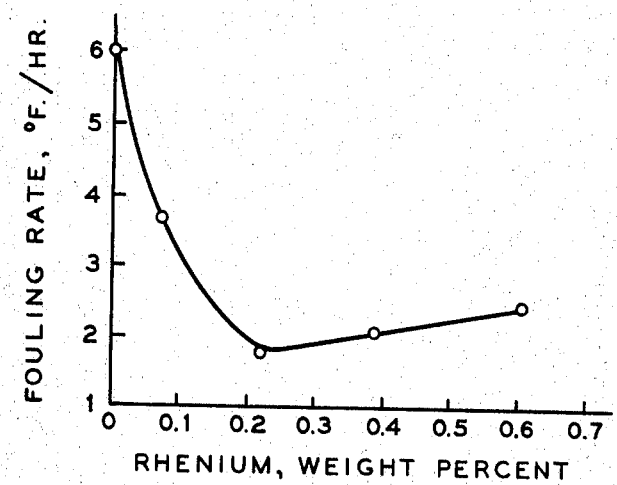

The porous solid carrier or support which is employed in the preparation of the platinum-rhenium catalyst of the present invention can include a large number of materials upon which the platinum and rhenium can be disposed. The porous solid carrier can be, for example, silicon carbide, charcoal, or carbon. Preferably, the porous solid carrier is an inorganic oxide. A high surface area inorganic oxide carrier is particularly preferred, e.g., an inorganic oxide having a surface area of 50–700 m.²/gm. The carrier can be a natural or a synthetically produced inorganic oxide or combination of inorganic oxides. Typical acidic inorganic oxide supports which can be used are the naturally occurring aluminum silicates, particularly when acid treated to increase the activity, and the synthetically-produced cracking supports, such as silica-alumina, silica-zirconia, silica-alumina-zirconia, silica-magnesia, silica-alumina-magnesia, and crystalline zeolitic aluminosilicates. Generally, however, reforming processes are preferably conducted in the presence of catalysts having the low cracking activity, i.e., catalysts of limited acidity. Hence, preferred carriers are inorganic oxides such as magnesia and alumina. Catalysts of limited acidity can be prepared from oxide supports of high acidity by poisoning the excess acid sites, e.g., by incorporating alkali or alkaline earth compounds with the acidic oxides.

A particularly preferred catalytic carrier for purposes of this invention is alumina. Any of the forms of alumina suitable as a support for reforming catalysts can be used. Furthermore, alumina can be prepared by a variety of methods satisfactory for the purposes of this invention. The preparation of alumina for use in reforming catalysts is well known in the art.

The platinum and rhenium should exist with the porous solid carrier in certain specified amounts and ranges. The platinum should be present in an amount from 0.1 to 3.0 weight percent based on the finished catalyst; the rhenium should also be present in an amount from 0.1 to 3.0 weight percent based on the finished catalyst. Higher amounts of the metals can be used, but generally the expense of the metals prohibits greater amounts than 3.0 weight percent. Amounts less than 0.1 weight percent can also be used, but in general lower levels are unsatisfactory for reforming purposes. Preferably the platinum and rhenium will each be present in an amount from 0.1 to 1.0 weight percent and more preferably, from 0.2 to 0.8 weight percent.

It is essential for purposes of the present invention that the atomic ratio of the rhenium to platinum be not greater than 1.0. That is, the rhenium to platinum atomic ratio should be 1.0 or less than 1.0. More preferably the atomic ratio of rhenium to platinum should be less than about 0.7. Inasmuch as rhenium and platinum have almost the same atomic weight, the atomic ratio is essentially the same as the weight ratio.

The metals, platinum and rhenium, when prepared in accordance with the method described herein, appear to exist as an alloy in association with porous solid carrier. More particularly, substantially all the platinum and rhenium appear to be present essentially as a solid solution of rhenium dispersed through the face-centered cubic structure of platinum. Thus, substantially only one phase appears to exist in the platinum-rhenium alloy of the present invention, the face-centered cubic platinum structure with rhenium dispersed throughout said structure.

The platinum and rhenium catalyst is preferably prepared by incorporating compounds of platinum and rhenium onto the porous solid carrier and then simultaneously reducing the metal compounds to the metallic state. Although platinum and rhenium can be associated as compounds with the porous solid carrier by several suitable techniques such as ion-exchange, coprecipitation, etc., the metals are preferably associated with a porous solid carrier by impregnation. It is not necessary that the metals, as compounds, be simultaneously incorporated onto the porous solid carrier. Thus, platinum could be added to the carrier as, for example, chloroplatinic acid, the resulting catalyst dried and calcined, and then rhenium added to the porous solid carrier as, e.g., perrhenic acid, and the resulting composition of platinum and rhenium dried and calcined again. It is essential, however, that the metals be simultaneously reduced in order to produce the catalyst. If one metal is in the reduced state when the other metal is reduced, a uniform catalyst will not be formed.

In general, the metals, platinum and rhenium, are incorporated onto the carrier material from an aqueous solution of a decomposable compound of the metal in sufficient concentration to provide the desired quantity of metal in the finished catalyst; the resulting mixture is then heated to remove water. Chloroplatinic acid is generally the preferred form of platinum. Other feasible platinum-containing compounds, e.g ammonium chloroplatinates and polyammineplatinum salts, can be used. Rhenium compounds suitable for incorporation onto the carrier include, among others, perrhenic acid and ammonium or potassium perrhenates. It is contemplated in the present invention that incorporation of the metal compounds with the carrier can be accomplished at any particular stage of catalyst preparation. For example, if the metals are to be incorporated onto an alumina support, the incorporation may take place while the alumina is in the sol or gel form prior to precipitation of the alumina. Alternatively, a previously prepared alumina carrier can be impregnated with a water solution of the metal compounds. Either metal compound can be associated with the carrier first. Also both metal compounds can be associated with the carrier simultaneously as, for example, by coimpregnation.

Following incorporation of the carrier material with water soluble compounds of platinum and rhenium, the resulting composite is usually dried by heating at a temperature of, for example, no greater than about 500° F. and preferably at about 200° F. to 400° F. Thereafter the composite can be calcined at an elevated temperature, e.g., at about 900° F., if desired. If the metals are sequentially added to the carrier as, for example, by sequential impregnation, the carrier containing the first metal compound added can be dried and calcined prior to addition of the second metal compound. Thereafter the carrier containing both metals can be dried and calcined. Calcination at elevated temperatures, e.g. about 700° F., preferably 800° F., is generally sufficient to convert the platinum to the oxidized form. Calcination at a temperature above about 700° F. is generally sufficient to convert rhenium to the oxidized form. Thus, if platinum is added to the catalyst prior to introduction of rhenium, and the platinum is reduced to the metallic state, the platinum can be converted to the oxidized form by calcining at an elevated temperature, e.g. above 700° F. Thereafter adding a compound of rhenium and subsequently simultaneously reducing the oxidized platinum and the rhenium compound will result in the production of a uniform catalyst of the two metals. Hence, if a catalyst comprising platinum on alumina is purchased and the platinum exists in the reduced form, the catalyst of the present invention can be obtained by oxidizing the platinum at an elevated temperature and then adding a rhenium compound followed by simultaneous reduction of the two metal compounds.

The reduction of the platinum and rhenium compounds to form the catalyst of the present invention is accomplished preferably at an elevated temperature in the presence of hydrogen and more preferably, dry hydrogen. In particluar it is preferred that the reduction be accomplished in the range of 600° F. to 1300° F., and preferably 600° F. to 1000° F. Enough hydrogen should be used and the contact time of the hydrogen with the metals should be long enough to reduce all the platinum and rhenium present on the carrier. Other reducing agents could be used besides hydrogen, e.g. carbon monoxide, or certain hydrocarbons as, for example, methane and ethane. However, hydrogen is the preferred reducing agent.

A preferred method for the preparation of the catalyst composition of the present invention is to incorporate platinum as chloroplatinic acid onto a porous solid carrier, e.g. alumina, and then dry the carrier containing chloroplatinic acid. Thereafter, rhenium as perrhenic acid is incorporated onto the carrier. The amount of chloroplatinic acid and perrhenic acid used should be sufficient to provide from 0.1 to 3.0 weight percent of each metal on the finished catalyst and an atomic ratio of rhenium to platinum of less than about 1.0. The carrier containing chloroplatinic acid and perrhenic acid is dried and then subjected to a reducing atmosphere, i.e., hydrogen, at an elevated temperature of from 600° F.–1000° F., to reduce the platinum and rhenium. Simultaneous reduction of the two metal components appears to result in the production of the alloy of rhenium dispersed throughout the face-centered cubic structure of platinum.

The effectiveness of the catalyst of the present invention is thought to be explained by the existence of an alloy of platinum and rhenium. Platinum, without rhenium present, exhibits the face-centered cubic structure, that is, the platinum atoms exist in ordered form characterized by a unit cell of the face-centered cubic type. An investigation of platinum by means of X-rays will indicate certain diffraction patterns which characterize the structure, i.e. arrangement of the atoms. The size, i.e., the lattice parameter of the unit cell of the platinum phase is about 3.922 Angstroms. When rhenium is present in an amount not exceeding that of platinum, i.e. when the rhenium to platinum atomic ratio is less than about 1.0, and preferably less than about 0.7 an alloy appears to be formed between platinum and rhenium, the rhenium atoms being dispersed throughout the face-centered cubic structure of the platinum. The face-centered cubic platinum phase apparently continues to exist and can be observed by X-ray diffraction methods. It appears that when the rhenium is present in an amount sufficient to give a rhenium to platinum atomic ratio of greater than about 0.7 and preferably greater than 1.0, the face-centered cubic platinum phase either exists with or is completely replaced by the phase comprising the hexagonal close-packed rhenium structure having platinum dispersed throughout. Applicant's invention is directed to the composition of matter comprising a porous solid carrier in association with simultaneously reduced platinum and rhenium in which substantially the only phase present appears to be the phase having rhenium dispersed throughout the face-centered cubic structure of platinum. Thus, the atomic ratio of rhenium to platinum should be 1.0 or less than 1.0 and preferably less than 0.7.

X-ray and electron diffraction studies of the metallic phases present in catalysts comprising various concentrations of platinum and rhenium supported on alumina apparently indicate platinum and rhenium phase changes similar to that observed in bulk platinum-rhenium systems, i.e., systems with no support present and prepared by melting the two metals and then solidifying the melt. Thus, reference to the phase diagram of the bulk platinum-rhenium phase system [see, for example, Hansen, M., and Anderko, K., "Constitution of Binary Alloys," McGraw Hill (1958)] shows that for concentrations of rhenium from 0 to about 40 atomic weight percent (the remainder being platinum) and at temperatures below about 1750° C., only one platinum-rhenium phase exists, that of the face-centered cubic (f.c.c.) structure of platinum with rhenium dispersed therein. Above about 40 atomic weight percent rhenium, the hexagonal close-packed (h.c.p.) structure of rhenium can also be observed. Above about 60 atomic weight percent rhenium, only the h.c.p. structure of rhenium is present. The platinum is dispersed throughout the h.c.p. structure of rhenium. Studies conducted with samples of catalyst comprising platinum alone on alumina, rhenium alone on alumina, and various concentrations of platinum and rhenium together on alumina appear to show that for concentrations of rhenium on the catalyst of less than about 50 atomic weight percent of the total metals, platinum and rhenium, i.e. the atomic ratio of rhenium to platinum is less than 1.0, the h.c.p. rhenium structure is not present to a significant extent or, at least, not readily detectable; substantially only the f.c.c. platinum structure exists. When the concentration of rhenium is sufficient to give an atomic ratio of rhenium to platinum of greater than about 1.0 in the finished catalyst, i.e. when rhenium comprises above about 50 atomic weight percent of the platinum and rhenium concentration, the h.c.p. rhenium structure is observed. The platinum-rhenium catalyst samples used to investigate the structure of the metals were prepared by heating catalyst samples containing compounds of the metals to elevated temperatures, e.g. 850° C., in either wet or dry hydrogen to simultaneously reduce the metal compounds.

In bulk platinum-rhenium alloy systems, when the concentration of rhenium is less than that of platinum, i.e. the f.c.c. platinum structure exists, the addition of rhenium results in a decrease in the size, i.e. lattice spacing, of the f.c.c. unit cell. It is observed in catalyst systems of platinum and rhenium supported on alumina that the addition of rhenium also decreases the size of the unit cell of the f.c.c. structure of the platinum. The decrease in lattice spacing in bulk platinum-rhenium systems as rhenium is added to platinum under conditions to form an alloy can be observed from the increase in the angle of diffraction, $2\theta$, using $CuK_{\alpha 1}$ radiation, from the (311) plane of the f.c.c. platinum structure. Increasing the rhenium concentration in platinum-alumina catalysts also produces an increase in the diffraction angle, $2\theta$, from the (311) plane of the f.c.c. platinum structure.

The platinum-rhenium metal exists in the form of small particles on the porous solid carrier surfaces, i.e., particles less than about 40 Angstroms. Thus, the particles are preferably 8 Angstroms to 40 Angstroms in size. The metal is preferably distributed over the external surface of the carrier as well as over the pore surface.

The following example is given to show the necessity of having a rhenium to platinum atomic ratio of less than 1.0 and preferably less than about 0.7.

EXAMPLE

Several experiments were conducted using various levels of rhenium associated with catalysts comprising 0.6 weight percent platinum on alumina. The catalysts were prepared by incorporating rhenium as perrhenic acid onto composites comprising chloroplatinic acid on alumina. The rhenium was added in sufficient amount to give the desired weight percent on the finished catalyst. The composites comprising platinum and rhenium compounds were reduced simultaneously in flowing hydrogen (200 cc./min.) at a temperature of 900° F. over a period of one hour.

Figure 2:
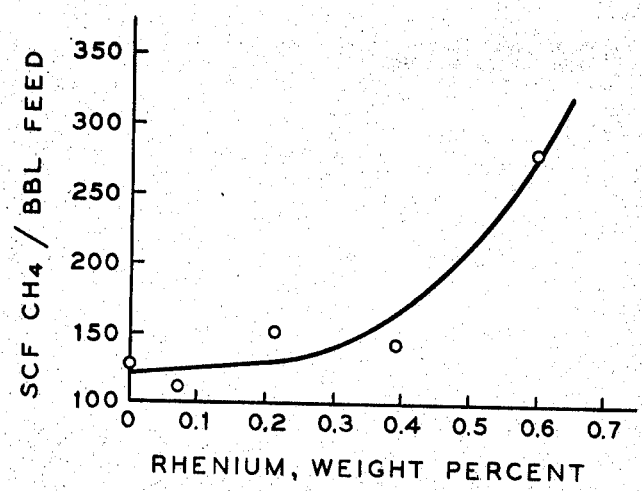

The catalysts were then tested in a reforming process using a hydrocarbon feed boiling in the range of 151 to 428° F. and containing 34 volume percent naphthenes, 37 volume percent paraffins, and 29 volume percent aromatics. The reforming process was conducted at a pressure of 125 p.s.i.g., a liquid hourly space velocity of 3.0, and a hydrogen to hydrocarbon mole ratio of 3.0 to produce a 102 F-1 clear octane product. The catalysts were not sulfided prior to or during the reforming runs. The fouling rates of the catalysts, as measured by the temperature increase per unit of time necessary to maintain a constant conversion, i.e. 102 F-1 clear octane product, were measured for the various catalytic compositions. Also, the extent of hydrocracking as measured by the methane produced per barrel of feed about ten hours after start of run was determined for each catalytic composition. The results for the fouling rate as a function of the weight percent rhenium on the platinum-alumina composites are shown in FIG. 1. The extent of hydrocracking as measured by the methane produced per barrel of feed as a function of the weight percent rhenium on the platinum-alumina composites is shown in FIG. 2. From FIG. 1 it can be seen that when the rhenium concentration is too low, i.e. less than about 0.1 weight percent, the fouling rate becomes excessively high. Thus, the catalysts deactivate too rapidly to be useful in the reforming process. From FIG. 2 it can be seen that as the concentration of rhenium increases beyond that of the concentration of platinum and more preferably as the rhenium to platinum atomic ratio exceeds about 0.7 (i.e., above about 0.4 weight percent rhenium in FIG. 1) the methane production increases exorbitantly. Thus, the hydrocracking activity of the catalyst is too high for the catalyst to be useful in normal reforming processes without special precaution being taken to reduce the hydrocracking. The excessive hydrocracking of catalysts comprising higher levels of rhenium than platinum appears to be due to the excess rhenium present. The excess rhenium apparently exists in the h.c.p. form either with or without platinum dispersed therein. The catalyst compositions prepared in accordance with the preparation procedure of the present invention and which appear to result in the formation of a platinum-rhenium alloy having rhenium dispersed throughout the f.c.c. structure of platinum have less hydrocracking activity and thus are more selective for the production of high octane gasoline.

The catalyst composition of the present invention can exist with halides present, particularly fluoride or chloride. The halides apparently present a limited amount of acidity to the catalysts which is beneficial to most reforming operations. A catalyst promoted with halide preferably contains from 0.1 to 3.0 weight percent halide content. The halides can be incorporated onto the catalyst carrier at any suitable stage of catalyst manufacture, e.g. prior to or following incorporation of the platinum and rhenium. Some halide is often incorporated onto the carrier when impregnating with platinum; for example, impregnation with chloroplatinic acid normally results in chloride addition to the carrier. Additional halide may be incorporated onto the support simultaneously with incorporation of the metal if so desired. In general, the halides are combined with the catalyst carrier by contacting suitable compounds such as hydrogen fluoride, ammonium fluoride, hydrogen chloride, or ammonium chloride, either in the gaseous form or a water soluble form with the carrier. Preferably, the fluoride or chloride is incorporated onto the carrier from an aqueous solution containing the halide.

The final catalyst composition containing simultaneously reduced platinum and rhenium on a porous solid carrier can be prepared in several forms depending on the particular process in which it is to be used. Thus, if the catalyst is to be used in a reforming process conducted in a fixed bed or moving bed, the catalyst mixture will be formed into tablets, pellets, spheroidal particles, or extruded particles; if a fluidized bed is desired, the catalyst will be provided in a finely-divided form.

The catalyst composition of the present invention finds its greatest utility in reforming of light hydrocarbon oils, e.g. naphtha fractions. Generally, the naphtha will boil in the range falling within the limits of from about 70 to 550° F. and preferably from 150 to 450° F. The feedstock can be, for example, either straight-run naphtha or a thermally cracked or catalytically cracked naphtha or blends thereof. The feed is preferably essentially sulfur free; that is, the feed should preferably contain less than 10 p.p.m. and more preferably less than 5 p.p.m. and still more preferably less than 1 ppm. Feedstocks which are not already low in sulfur can be hydrodesulfurized by conventional means to obtain suitable low sulfur level feeds.

Reforming of naphthas is generally conducted at reforming conditions including a temperature within the range of 600° to 1100° F., and preferably 700° to 1050° F. The pressure in the reforming reaction zone can be atmospheric or superatmospheric and preferably is within the range of 25 to 1000 p.s.i.g. and more preferably, 50 to 750 p.s.i.g. The temperature and pressure can be correlated with the liquid hourly space velocity to favor any particular reforming reaction desired as, for example, aromatization or isomerization or dehydrogenation. In general, the liquid hourly space velocity will be from 0.1 to 10 and preferably from 1 to 5.

Reforming generally results in the production of hydrogen. Thus, excess hydrogen need not necessarily be added to the reforming system. However, it is generally preferred to introduce excess hydrogen at some stage during the operation as, for example, during startup. The hydrogen, either fresh or recycle, can be introduced into the feed prior to contact with the catalyst or contacted simultaneously with introduction of the feed to the reaction zone. Hydrogen is preferably introduced into the reforming reactor at a rate of 0.5 to 20 moles of hydrogen per mole of feed.

The foregoing disclosure of this invention is not to be considered as limiting since many variations can be made by those skilled in the art without departing from the scope or spirit of the appended claims.

I claim:
1. A process which comprises reforming a naphtha fraction containing less than about 10 p.p.m. sulfur at reforming conditions in the presence of hydrogen with a catalyst prepared by impregnating a porous inorganic oxide carrier successively or simultaneously with water-soluble compounds of platinum and rhenium in sufficient concentration to provide from 0.1 to 3 weight platinum and from 0.1 to 3 weight percent rhenium, based on the finished catalyst, the atomic ratio of rhenium to platinum being less than about 1, and then heating the impregnated carrier in the presence of hydrogen at a temperature of from 600° to 1300° F.

2. The process of claim 1 wherein said carrier is alumina.

3. A process in accordance with claim 1, including:
drying said impregnated carrier prior to heating it in the presence of hydrogen.

4. A process in accordance with claim 1, wherein said water-soluble compounds of platinum and rhenium are chloroplatinic acid and perrhenic acid respectively.

References Cited

UNITED STATES PATENTS

| | | | |
|---|---|---|---|
| 2,894,898 | 7/1959 | Oettinger et al. | 208—213 |
| 2,939,847 | 6/1960 | Smith et al. | 252—439 |
| 3,236,765 | 2/1966 | Erbelding | 208—138 |
| 3,296,118 | 1/1967 | Czajkowski et al. | 208—138 |
| 3,415,737 | 12/1968 | Kluksdahl | 208—138 |

OTHER REFERENCES

Blom et al. "Hydrocarbon Processing and Petroleum Refiner" vol. 42, #10, pps. 132–134 (1965).

Blom et al., I and E Chem., 54 No. 4, pps. 16–22 (April 1962).

HERBERT LEVINE, Primary Examiner

U.S. Cl. X.R.

252—466